UNITED STATES PATENT OFFICE.

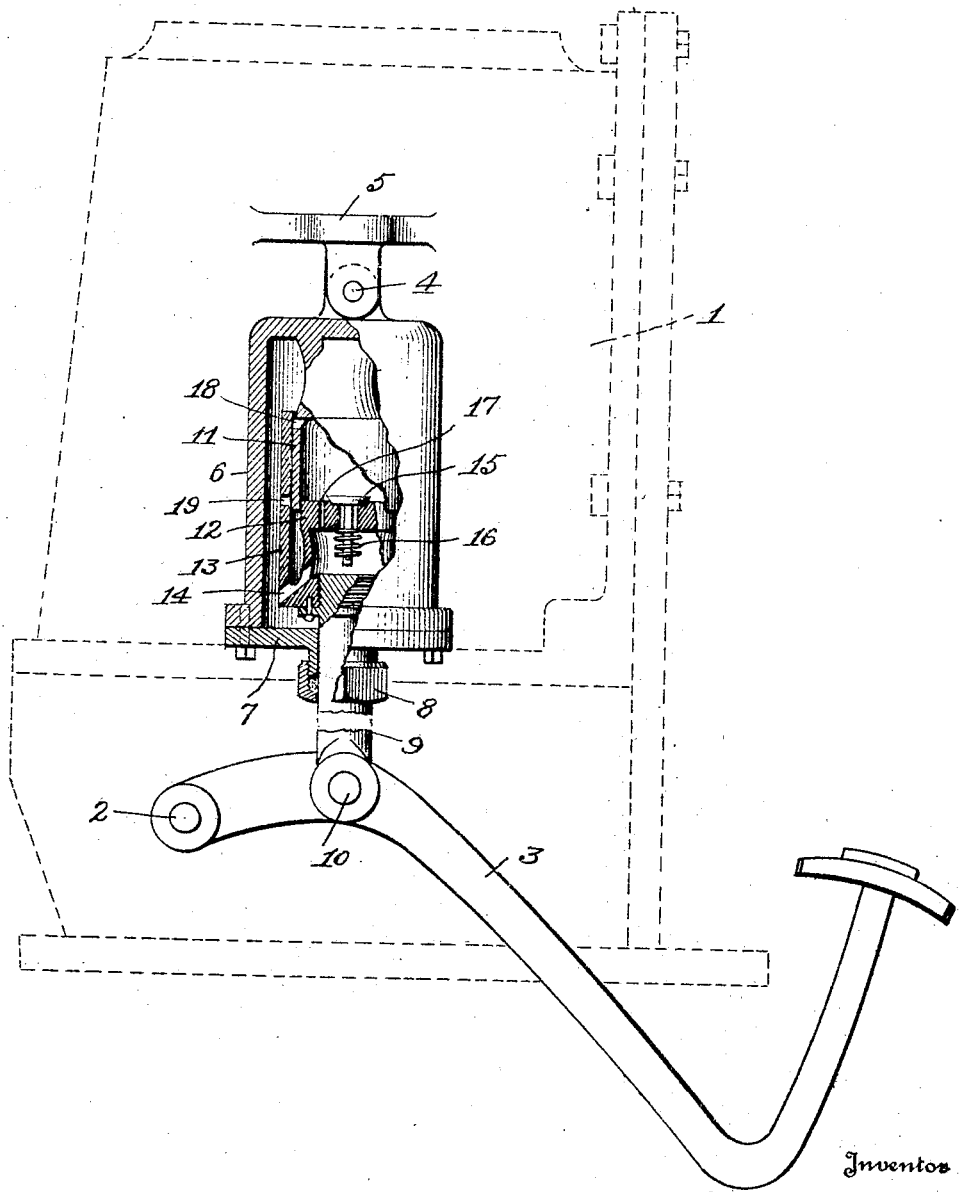

JULIUS G. KOPPEL, OF AKRON, OHIO.

CLUTCH-CONTROLLING MECHANISM.

1,376,341.  Specification of Letters Patent.  Patented Apr. 26, 1921.

Application filed May 24, 1920. Serial No. 383,744.

*To all whom it may concern:*

Be it known that I, JULIUS G. KOPPEL, a citizen of the United States, residing at Akron, county of Summit, State of Ohio, have invented certain new and useful Improvements in Clutch - Controlling Mechanism, of which the following is a specification.

This invention relates to motor vehicles, and more particularly to the clutch controlling mechanism thereof, and has for its objects, first, to provide an improved mechanism for automatically retarding the application of the clutch, and, secondly, to provide for a complete release of the retarding mechanism at substantially the completion of the return movement of the clutch foot lever.

Heretofore considerable difficulty has been experienced in properly applying the clutch which connects the engine or motor with the driving wheels. Owing to the lack of skill on the part of the operator, or because of the design of the clutch, or condition of the clutch surfaces, the clutch may operate too quickly and without preliminary slipping, and as a result either the engine will be stalled, or the vehicle will be started with a violent jerk, putting a severe strain upon the mechanism and causing discomfort to the passengers. With some types of clutches, even the most skilled operator finds difficulty in avoiding this sudden seizure of the clutch.

These difficulties I overcome in the manner and by the means hereinafter described and claimed, reference being had to the accompanying drawing, in which:—

The figure is a side elevation partly in section of my improved clutch controlling device, shown applied to the clutch compartment of a motor vehicle.

In the said drawing, the reference numeral 1 denotes the usual clutch compartment, the same being shown in dotted outline, and 2 the shaft which is connected by the usual mechanism with a conventional type of motor vehicle clutch (not shown). Fixed to said shaft is the usual foot lever 3 for operating the same, and pivoted at 4 to a bracket 5 formed on the clutch compartment 1 is a cylindrical casing 6 closed at its lower end by a suitable plate 7 having centrally therein a stuffing box 8, through which passes a shaft 9 that is pivoted at 10 to the foot lever 3 intermediate the length of the latter. Formed in the casing 6 and integral therewith is a depending cylindrical chamber 11 open at its lower end and receiving a piston 12 closely fitting therein, said piston being screwed to the shaft 9, as shown, and having formed integral therewith an exterior sleeve 13 surrounding the chamber 11. Adjacent the point of connection of said piston and sleeve with the shaft 9 is a passage 14 passing through said sleeve and piston and into the interior of the latter. Said piston is provided centrally with an upwardly opening puppet valve 15 normally retained closed by a spring 16, and said piston is also provided with a minute constantly open passage 17. Near its upper end the chamber 11 is provided with one or more lateral apertures 18, and the sleeve 13 is similarly apertured at 19 for a purpose hereinafter to be described.

The operation of the device is as follows:—By pushing down the clutch pedal 3, which disengages the clutch from the engine, the piston 12 is also pulled downward, the pressure of fluid in the casing 6 lifting the valve 15 and causing the cylinder 11 above said piston to be filled therewith. To reëngage the clutch, the pressure of the driver's foot is removed from the treadle 3, and the tension of the clutch spring will cause said pedal to rise, which rise will be resisted by the fluid in the chamber 11 until it can escape therefrom through the small passage 17, so that the clutch will come into gradual engagement in a predetermined time, usually regulated at from five to six seconds, this time limit being dependent upon the size of the aperture 17, as will be understood. When, however, the piston 12 has reached almost its upward limit of movement, the aperture or apertures 19 in sleeve 13 will register with the aperture or apertures 18 in the cylinder 11, thus permitting a free escape from said cylinder of the remaining fluid therein, and releasing the clutch spring to permit it to exercise its full tension to engage the clutch members.

Having thus fully described my invention, what I claim as new and desire to secure by Letters Patent, is:—

1. In a clutch controlling mechanism, the combination with the spring-pressed clutch, and its releasing lever, of a fluid containing casing, a cylinder within said casing provided with a constantly open small relief port and with an intake passage, a valve normally closing said intake passage, and a piston reciprocable in said cylinder and connected to be operated by said releasing lever, said cylinder being provided with a supplemental relief port adapted to be opened as said piston approaches its innermost limit of movement therein for quickly releasing said clutch.

2. In a clutch controlling mechanism, the combination with the spring-pressed clutch, and its releasing lever, of a fluid containing casing, a cylinder within said casing provided with a constantly open small relief port and with an intake passage, a valve normally closing said intake passage, a piston reciprocable in said cylinder and connected to be operated by said releasing lever, and a sleeve fixed to said piston and surrounding said cylinder, said sleeve and cylinder having relief ports therein adapted to register as said piston approaches its innermost limit of movement for quickly releasing said clutch.

In testimony whereof, I hereunto affix my signature.

JULIUS G. KOPPEL.